United States Patent
Davey

(10) Patent No.: US 7,416,201 B2
(45) Date of Patent: Aug. 26, 2008

(54) STEERABLE SINGLE WHEEL UNIT FOR TRAILERS

(75) Inventor: Garth Barrington Davey, Somerville (AU)

(73) Assignee: Steerable Wheel Systems Pty. Ltd., Somerville, Victoria (AU)

( * ) Notice: Subject to any disclaimer, the term of this patent is extended or adjusted under 35 U.S.C. 154(b) by 114 days.

(21) Appl. No.: 10/543,461

(22) PCT Filed: Jan. 28, 2004

(86) PCT No.: PCT/AU2004/000096

§ 371 (c)(1),
(2), (4) Date: Apr. 10, 2006

(87) PCT Pub. No.: WO2004/067358

PCT Pub. Date: Aug. 12, 2004

(65) Prior Publication Data

US 2006/0214408 A1    Sep. 28, 2006

(30) Foreign Application Priority Data

Jan. 28, 2003 (AU) ............................. 2003900336

(51) Int. Cl.
*B62D 7/18* (2006.01)

(52) U.S. Cl. ................... 280/124.126; 280/124.127; 280/93.512; 280/771; 384/126

(58) Field of Classification Search ............... 280/771, 280/124.126, 124.127, 124.154, 124.158, 280/92, 93.5, 93.503, 93.512; 180/436, 408, 180/409, 410, 411, 412, 414, 415, 418, 419, 180/420, 422, 423, 424, 434, 435, 439, 442; 384/46, 126, 194, 228, 240, 243, 452, 455

See application file for complete search history.

(56) References Cited

U.S. PATENT DOCUMENTS

| 4,168,869 | A | * | 9/1979 | Stephan | 384/455 |
| 4,381,827 | A | * | 5/1983 | Blackmore et al. | 180/420 |
| 4,466,751 | A | * | 8/1984 | Higuchi | 384/126 |
| 5,015,004 | A | * | 5/1991 | Mitchell | 280/81.6 |
| 5,403,031 | A | * | 4/1995 | Gottschalk et al. | 280/86.5 |
| 5,810,377 | A | * | 9/1998 | Keeler et al. | 280/93.512 |
| 5,816,605 | A | * | 10/1998 | Raidel, Sr. | 280/676 |
| 6,182,984 | B1 | * | 2/2001 | Chalin | 280/86.751 |
| 6,913,390 | B2 | * | 7/2005 | Inoue et al. | 384/476 |
| 7,178,984 | B2 | * | 2/2007 | Kruppa | 384/127 |
| 2003/0000765 | A1 | * | 1/2003 | Spadafora | 180/422 |

(Continued)

FOREIGN PATENT DOCUMENTS

EP    0 313 962    5/1989

(Continued)

*Primary Examiner*—Eric Culbreth
*Assistant Examiner*—Karen J Amores
(74) *Attorney, Agent, or Firm*—Workman Nydegger

(57) ABSTRACT

A single wheel unit adapted to be mounted on a vehicle body (11) comprising: a wheel frame supporting a suspension mechanism (15) and a wheel assembly mounted on the suspension mechanism (15), and steering means mounted between the wheel frame and vehicle body (11) for pivoting the wheel frame relative to the vehicle body (11) so as to steer a vehicle, wherein the steering means includes two steering components (30) pivotally attached (32, 33) one at each of the leading and trailing portions of the wheel frame and capable of being actuated to independently displace the leading and trailing portions laterally of the vehicle body (11).

21 Claims, 18 Drawing Sheets

U.S. PATENT DOCUMENTS

| | | | |
|---|---|---|---|
| 2004/0149510 A1* | 8/2004 | Otaki et al. | 180/442 |
| 2005/0087386 A1* | 4/2005 | Hennemann et al. | 180/418 |
| 2005/0098975 A1* | 5/2005 | Yun | 280/124.127 |
| 2006/0066070 A1* | 3/2006 | Haire | 280/124.157 |
| 2006/0214408 A1* | 9/2006 | Davey | 280/771 |
| 2006/0249923 A1* | 11/2006 | Ramsey | 280/124.131 |
| 2007/0187917 A1* | 8/2007 | Hasegawa et al. | 280/93.51 |
| 2007/0222169 A1* | 9/2007 | Smith et al. | 280/124.157 |

FOREIGN PATENT DOCUMENTS

| | | |
|---|---|---|
| WO | WO 01/53141 A1 | 7/2001 |
| WO | WO 02/45989 A1 | 6/2002 |

* cited by examiner

STEERABLE SINGLE WHEEL UNIT FOR TRAILERS

The present invention relates to a steerable single wheel unit particularly for use with heavy transport trailers having single wheel sets.

Approximately 20% of heavy transport trailers are extra heavy duty trailers for transporting larger loads. These trailers require a dual wheel system with front and rear trailer axles provided with adjacent pairs of dual-wheels to support excessive loads. The remaining 80% of heavy trailers are capable of supporting maximum payloads with a single wheel set.

Wheels on most trailers are mounted on cross axles grouped at the front and rear of the trailer for trailer steering and reduced tyre scuffing. However, trailers of this kind have limited maneuverability. Locating tyres mid-length of the trailer is inappropriate as the tyres would drag across the road with every turn of the trailer resulting in high tyre wear and also road wear. Additionally, tyres located at mid-length would be unable to adequately clear bumps and other road protrusions without disrupting the overall suspension of the trailer. With the trailer being supported by only the wheels at the front and rear, the trailer chassis extending between the drive axle at the front of the trailer and the rear axle must be sufficiently strong to support payloads at the mid-length of the trailer where no wheel support exists.

Attempts have been made to produce steerable wheels for mounting at any point along the trailer's length to reduce scuffing of tyres and increase trailer payload. However, these attempts have been largely unsuccessful. Existing mechanically and automatically driven steering wheel units that have been successful are capable of only pivoting the trailer at one fixed predetermined point on the trailer's length, which limits the trailer's maneuverability.

It is sought with the present invention to provide a trailer with increased maneuverability, capacity for a greater payload and reduced tyre wear.

According to the present invention there is provided a single wheel unit adapted to be mounted on a vehicle body comprising:

a wheel frame supporting a suspension mechanism and a wheel assembly mounted on the suspension mechanism, the wheel frame having a leading portion and a trailing portion; and steering means mounted between the wheel frame and vehicle body for pivoting the wheel frame relative to the vehicle body so as to steer a vehicle, wherein the steering means includes two steering components pivotally attached one at each of the leading and trailing portions of the wheel frame and capable of being actuated to independently displace the leading and trailing portions laterally of the vehicle body.

The steering components are preferably linear bearing actuators having a reciprocating piston, wherein the pistons are mounted to the frame by way of a hinge connection. Preferably, actuation of a first linear bearing actuator causes the leading portion to displace and wheel frame to pivot at the trailing portion to steer the vehicle in a first direction. Conversely, actuation of the second linear bearing actuator causes the wheel frame to pivot at the leading portion to steer the vehicle in a second direction. One linear bearing actuator is preferably adapted to be pivotally mounted to the vehicle body. The linear bearing actuators operate on two separate hydraulic fluid circuits, wherein the admission of hydraulic fluid into one circuit causes the piston to extend from an actuator housing and the admission of fluid into the second circuit causes the piston to withdraw into the actuator housing, simultaneously causing the hydraulic fluid to discharge from the first circuit.

According to the present invention there is still further provided a bearing assembly located between two pivoting components, the bearing assembly comprising a cylindrical sleeve bearing defining a central axis and having open ends with convexed shoulders, the sleeve bearing being located in a bore of a first pivoting component and a shaft is journaled through the sleeve bearing, the shaft extending through apertured flanges in the second pivoting component which flanges are located on either side of the bore and sleeve bearing, wherein the flange apertures contain concave faces to correspondingly receive the convexed shoulders of the sleeve bearing.

The bearing assembly is preferably adapted to support unbalanced loads whereby the corresponding convexed shoulder and concave face allow unbalanced point loads to be distributed over a larger area to reduce the structural stress on the bearing at the point load.

The sleeve bearing preferably includes two sleeve sections, with a curved shoulder located on an end of each sleeve section, and a spacer located inbetween the sleeve sections in the bore. The sleeve bearing is ideally almost fully located in the bore with only the curved shoulders protruding from the ends of the bore.

BRIEF DESCRIPTION OF THE DRAWINGS

The present invention is described further by way of example with reference to the accompanying drawings by which.

DETAILED DESCRIPTION OF PREFERRED EMBODIMENT

Figure 4:
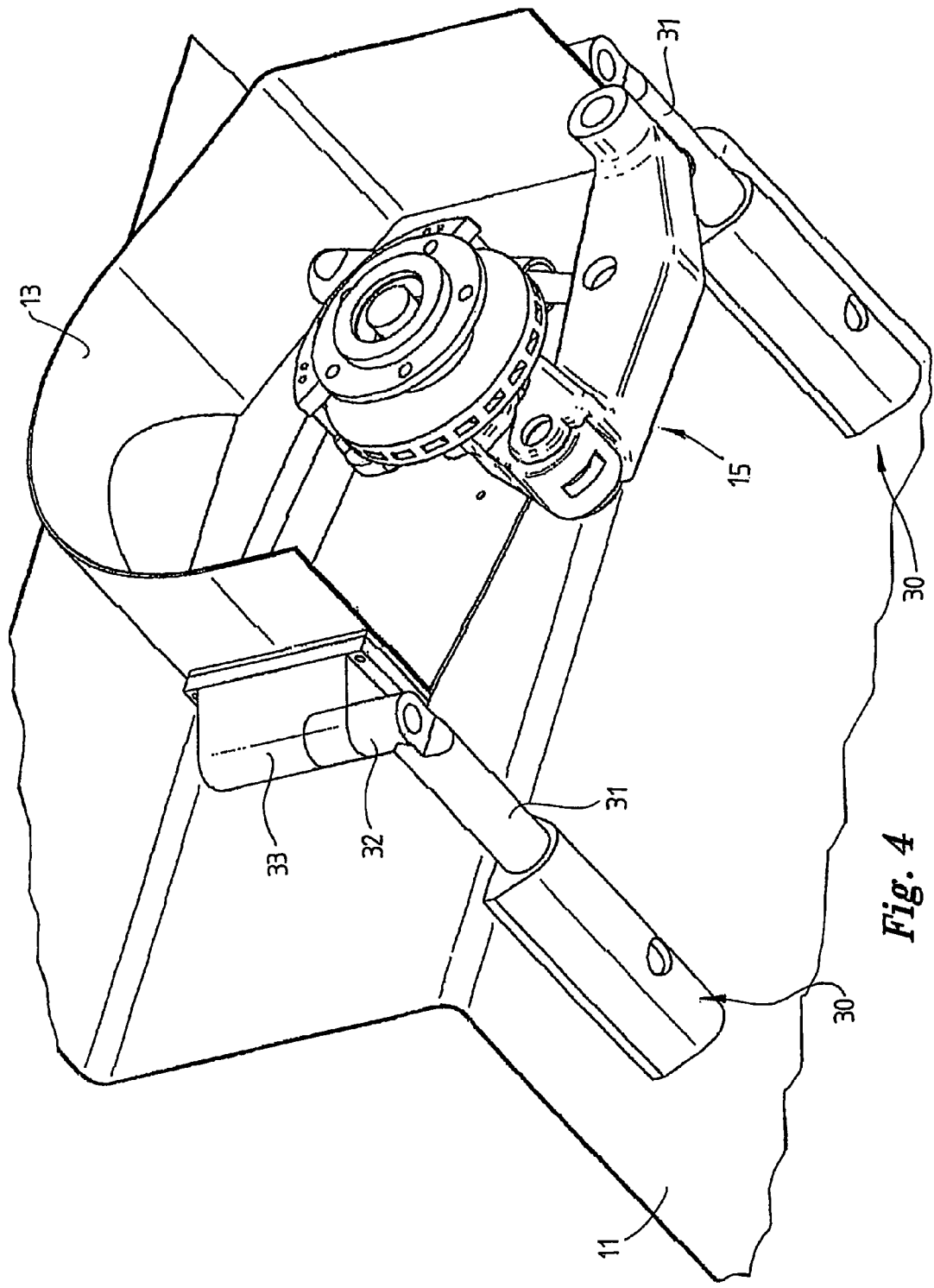
FIG. 4 is a first perspective view of the underside of the wheel unit.
Figure 5:
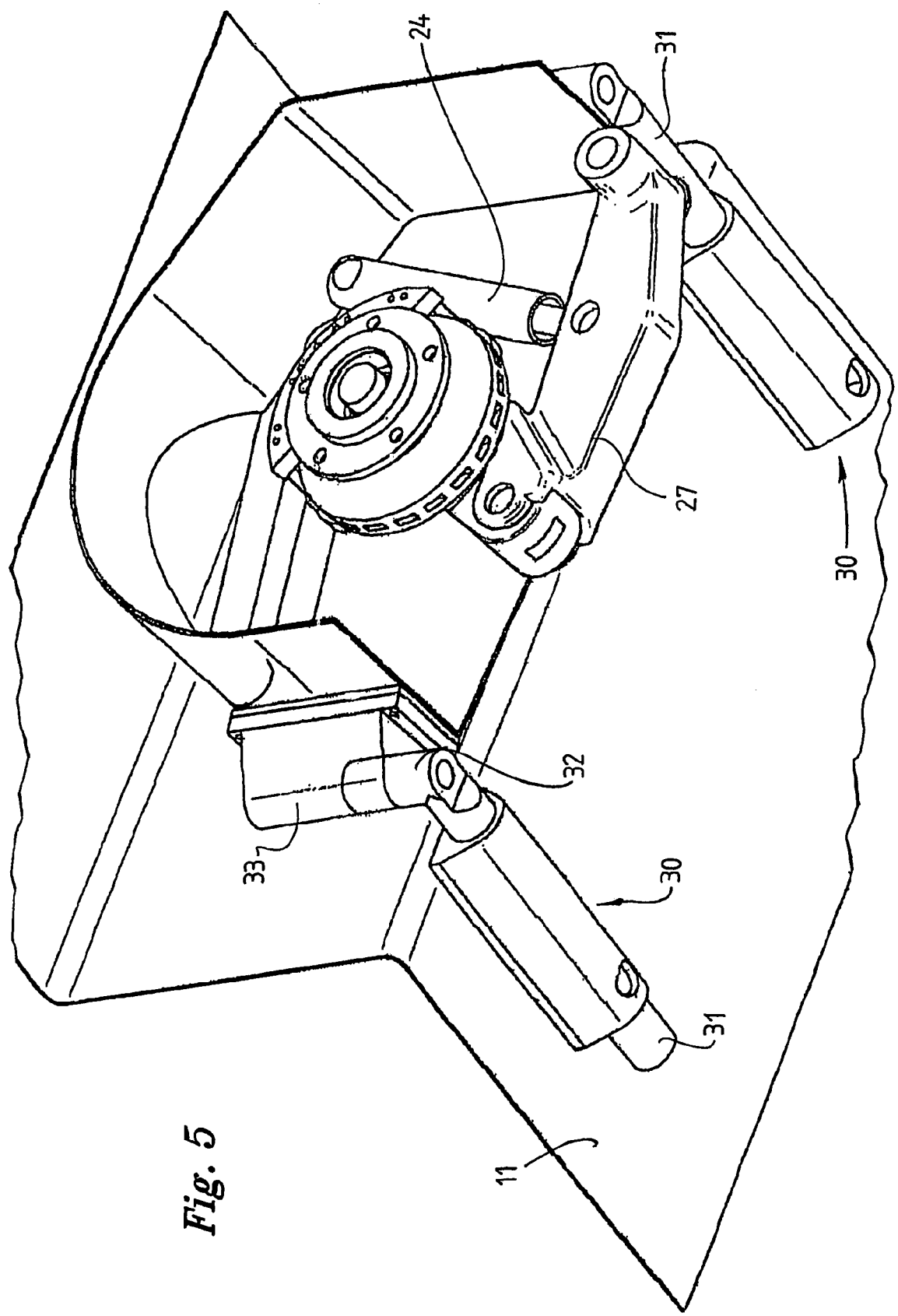
FIG. 5 is a second perspective view of the underside of the wheel unit.

The figures illustrate an independently supported and independently steerable single wheel unit 10, which is self-contained and adapted to be mounted to a trailer body 11. FIGS. 4 and 5, in particular, illustrate the wheel unit securely mounted at a linear bearing actuator 30 to the underside of the trailer body 11.

Figure 1:
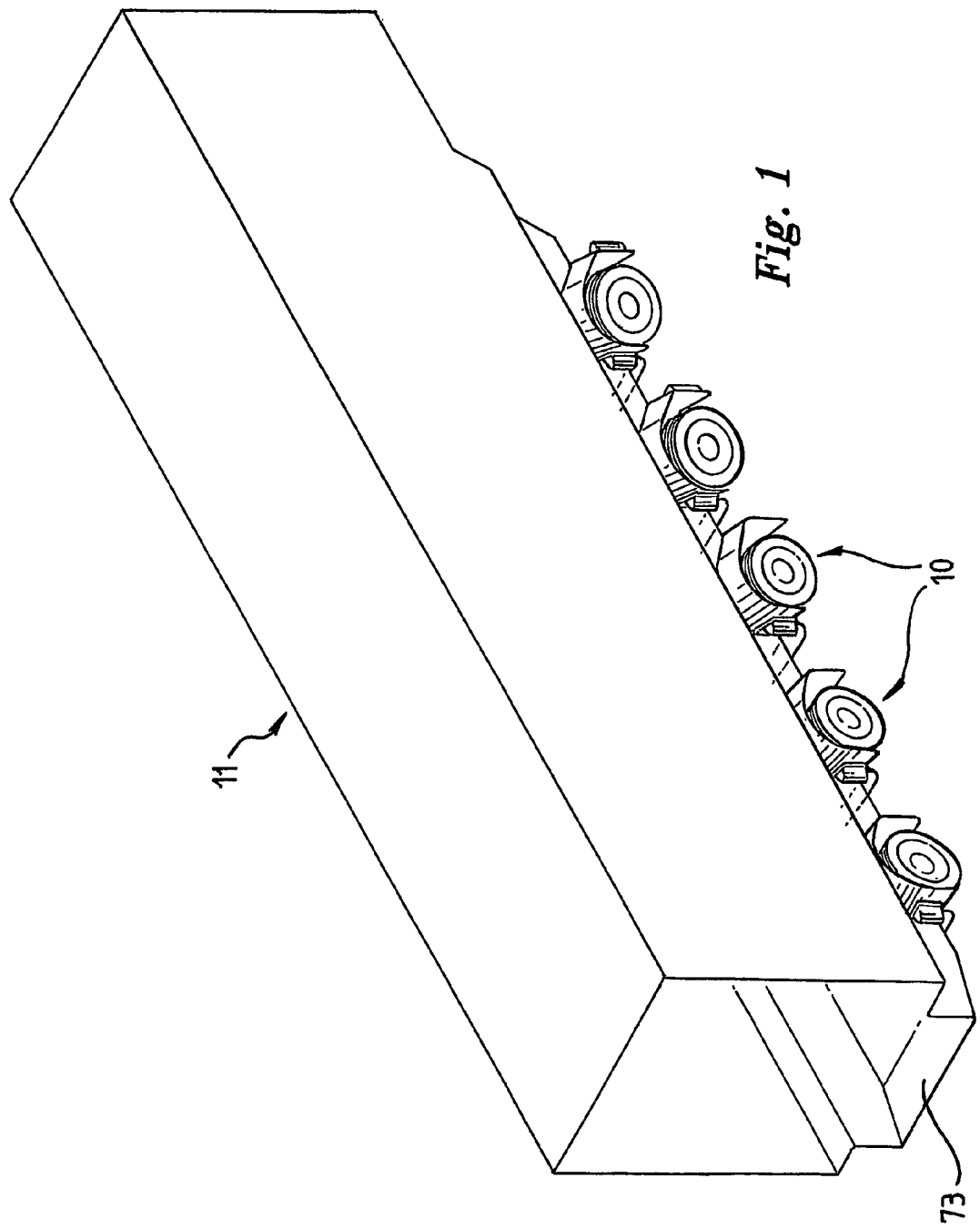
FIG. 1 is a perspective view of a trailer vehicle mounted with steerable single wheel units according to the present invention.

FIG. 1 illustrates a trailer body 11 with five single wheel units distributed evenly along the whole length of the trailer body. Even distribution along the length of the trailer is possible by virtue of the independent nature of the wheel unit whereby each tyre has its own independent suspension and is steered independently of all other tyres.

Smooth trailer turning without tyre dragging is effected by the wheels at the front of the trailer having a greater turning angle than those at the rear with the turning angle of the tyres inbetween incrementally decreasing. Different turning angles dependent on tyre location directs each tyre in the swept path of the wheels of a prime mover towing the trailer, which drastically increases trailer maneuverability. Even distribution of wheels along the length of the trailer brings about the added advantage of a lighter trailer construction and the possibility of carrying a greater payload.

The single wheel unit comprises a rigid main frame 12 which partially surrounds a suspension mechanism 15 and wheel assembly 16 and acts as a mudguard. Main frame 12 is constructed from an arched cover 13 and an end panel 14 enclosing one side of the frame 12.

FIGS. 2 to 8 illustrate from different angles the suspension mechanism 15 which is pivotally anchored at two points to the end panel 14 of the main frame. The suspension mechanism 15 carries the wheel stub axle 20 which supports the wheel hub 21, tyre (not shown) and a compact hydraulic disc brake 22 which fits entirely within the tyre rim.

Figure 6:
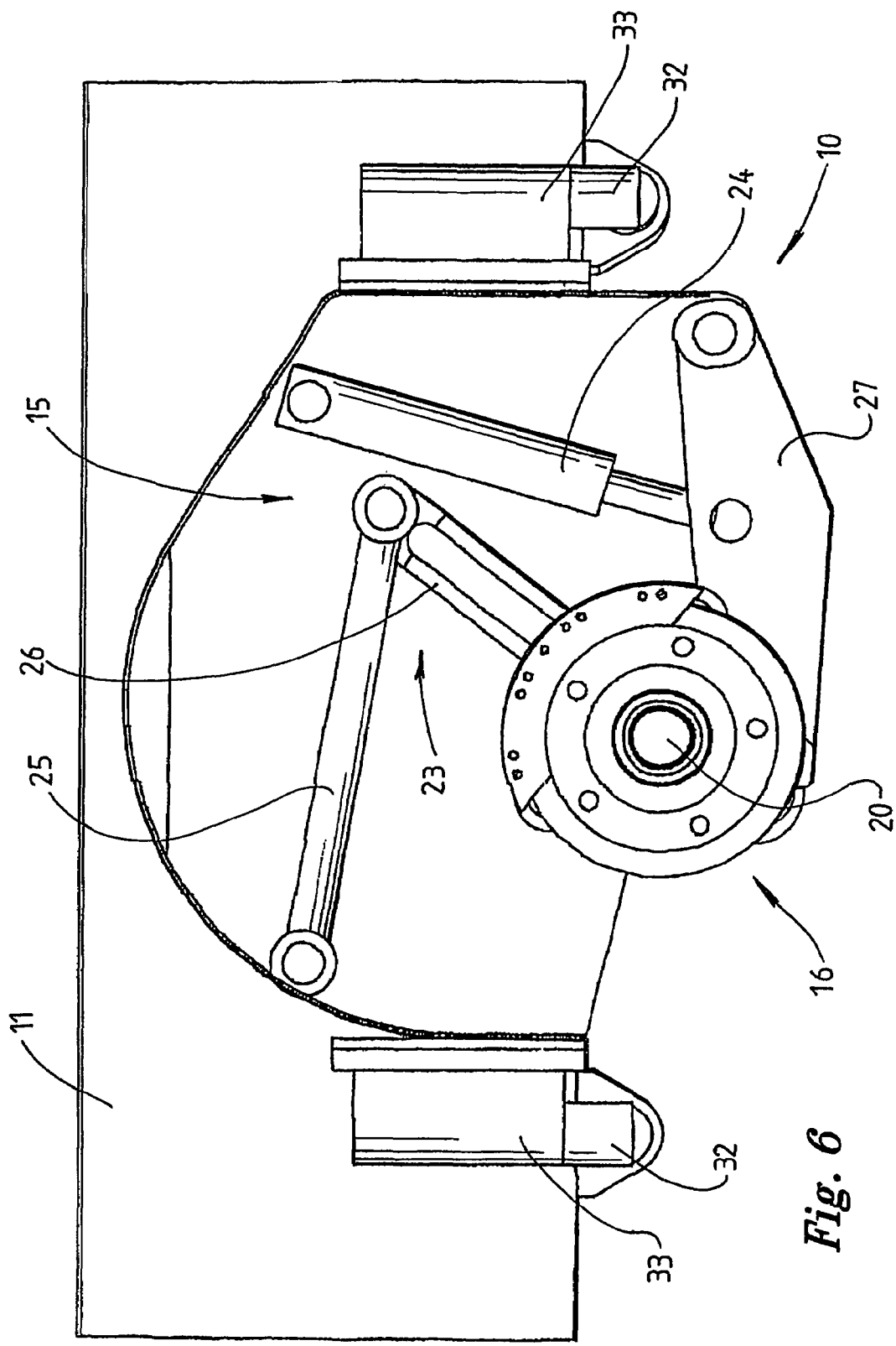
FIG. 6 is a side elevational view of the wheel unit illustrating the wheel hub lowered to an intermediate position.
Figure 7:
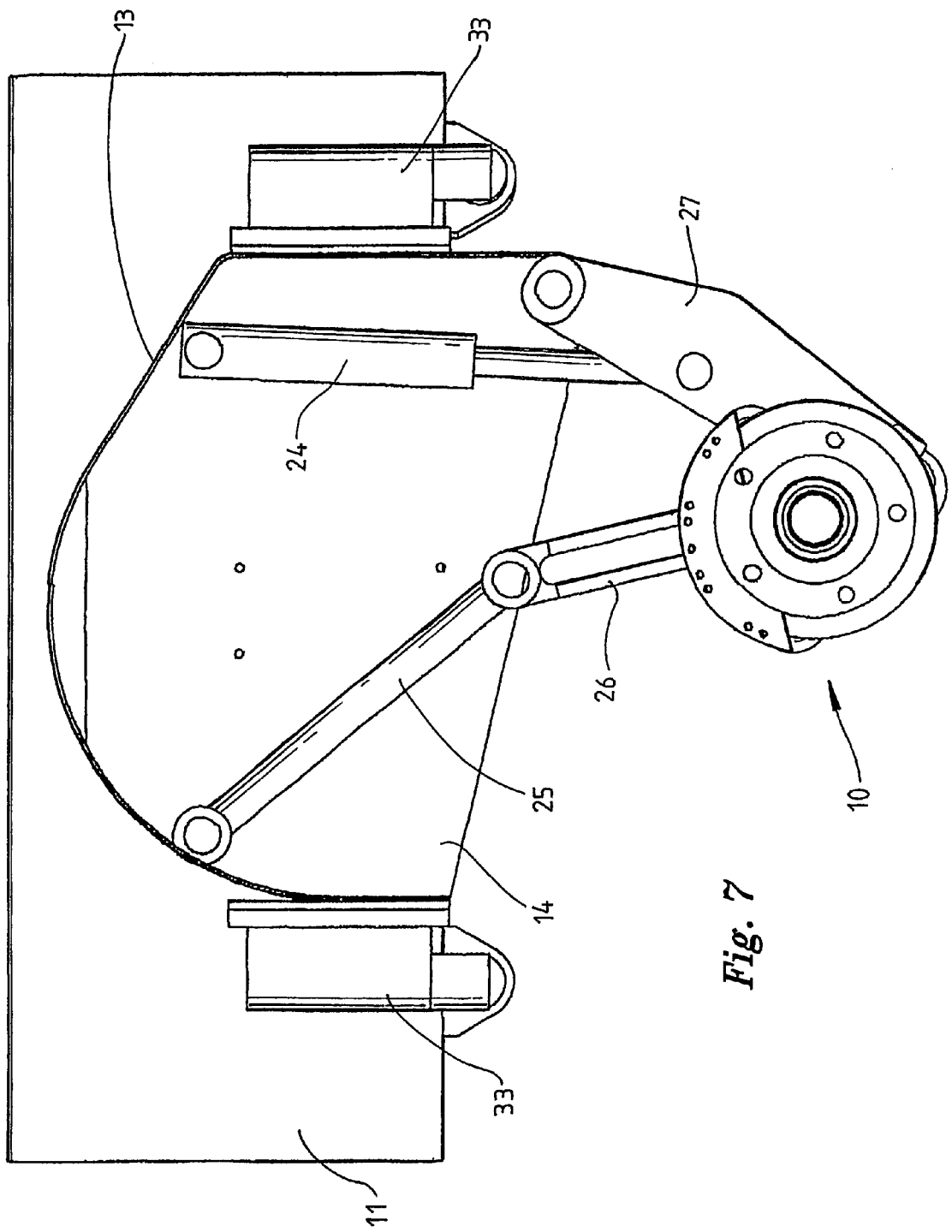
FIG. 7 is a similar view to FIG. 6 illustrating the wheel hub lowered to a lowest position.
Figure 8:
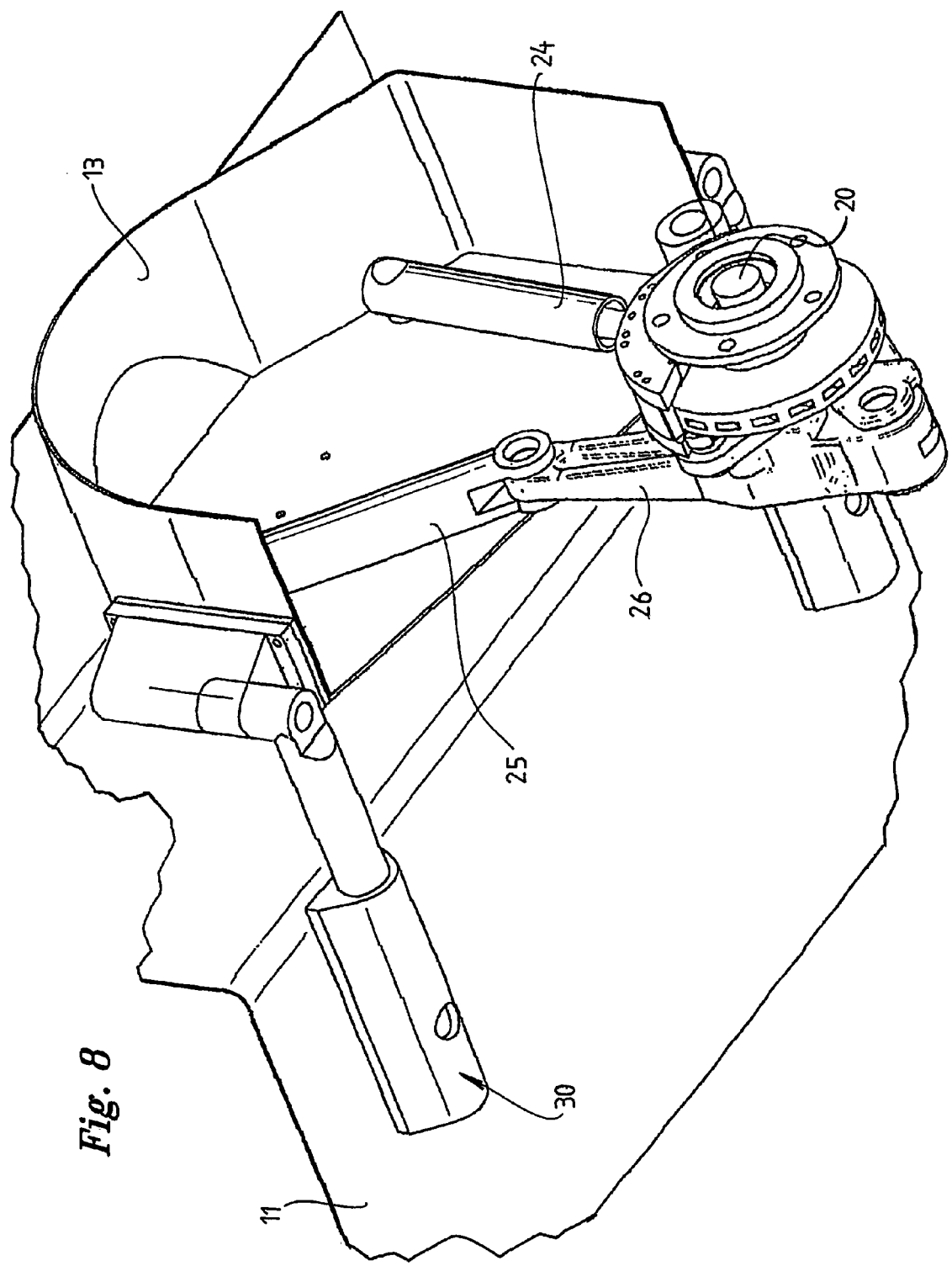
FIG. 8 is a perspective view of the underside of the wheel unit illustrating the wheel hub in the lowest position.

As best illustrated in FIGS. 6 and 7, the suspension mechanism 15 comprises a suspension cylinder 24 and a "Z" link 23 made up of a central arm 26 pivotally joined at each end to an upper arm 25 and a lower arm 27. The arms are structurally rigid and the central arm 26 supports at its lower end the stub axle 20.

Figure 2:
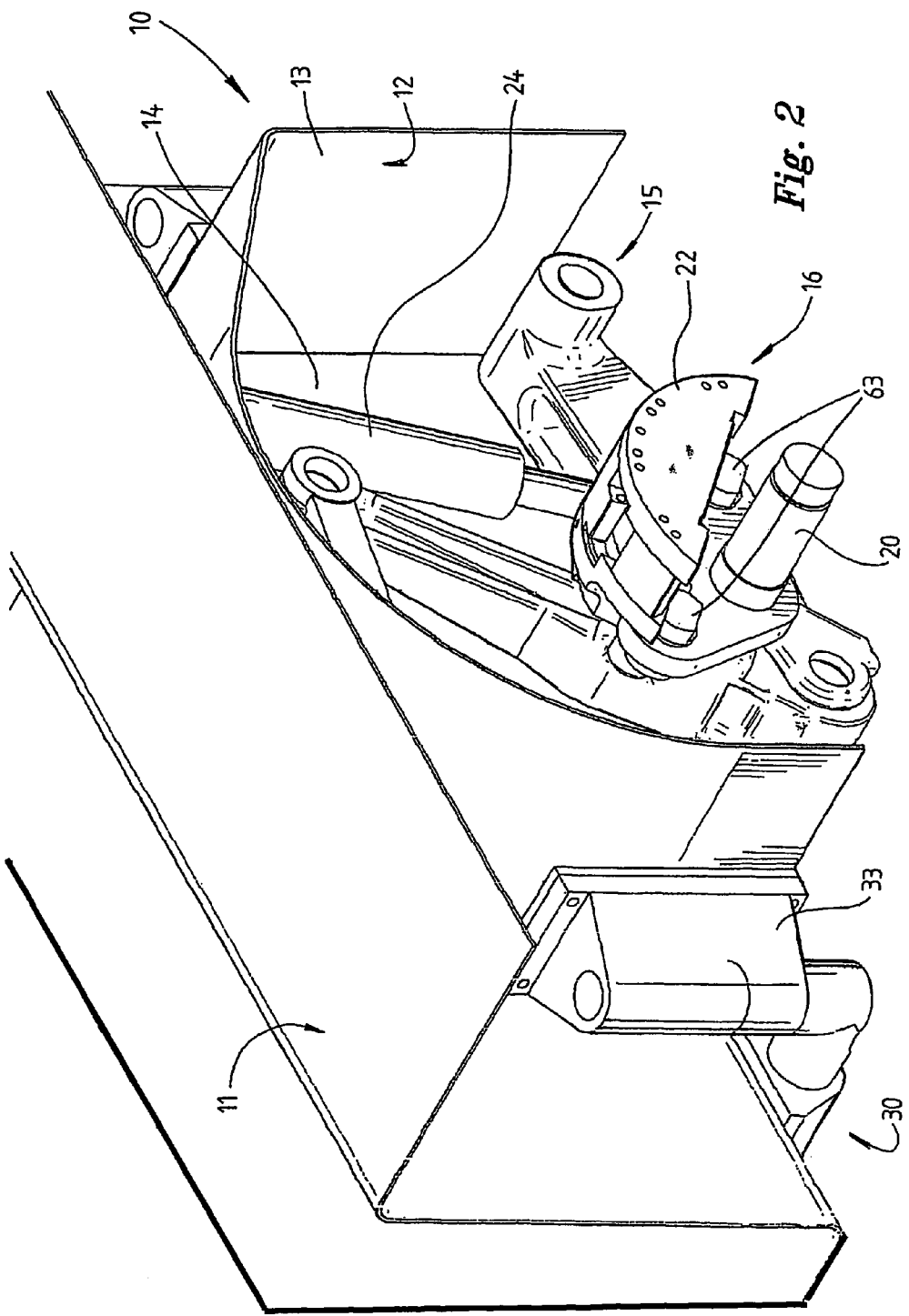
FIG. 2 is an upper perspective view of a steerable single wheel unit of the present invention.

The "Z" link is pivotally restrained at its free ends to the trailer body 11. The "Z" link allows vertical travel of the trailer wheel from a raised position relative to the wheel unit 10, and as illustrated in FIG. 2, to an intermediate position illustrated in FIG. 6 and to a lowered position illustrated in FIG. 7. The vertical travel distance is envisaged to be approximately 600 mm.

Motion of the suspension mechanism is dampened or actuated by a pneumatic or hydraulic cylinder 24 attached at one end to main frame 12 and at the other end to lower arm 27. Actuation of cylinder 24 lowers the trailer body relative to the ground for easier loading and unloading of goods. The trailer deck can be lowered to 300 mm of the ground. Extending the cylinder to move the suspension mechanism towards the position illustrated in FIG. 7 raises the trailer body for towing. When the trailer rides over uneven road surfaces the suspension mechanism 15 behaves as a true suspension to dampen the wheel and minimize disturbances to the trailer body.

Means for steering the single wheel unit 10 relative to the trailer body 11 is provided on each side of cover 13 and mounted to the underside of the trailer body 11. As best illustrated by the lower perspective views of FIGS. 4, 5 and 8, the steering means is mounted on each side of cover 13 and comprises two linear bearing actuators 30, each having an internal sliding piston 31, and an upright pin 32 supported on the end of the piston. Upright pin 32 is located at a right angle to the piston and directed upwardly. Each pin is received with a sliding fit in a sleeve 33 mounted on each side of the main frame 12 and sleeve 33 is adapted to pivot on pin 32.

The linear actuators 30 mounted to the underside of the trailer body support the entire weight of the single wheel unit. The combined operation of both linear actuators 30 causes the main frame 12 supporting the suspension mechanism and wheel assembly to turn at an angle to the trailer body.

Figure 9:
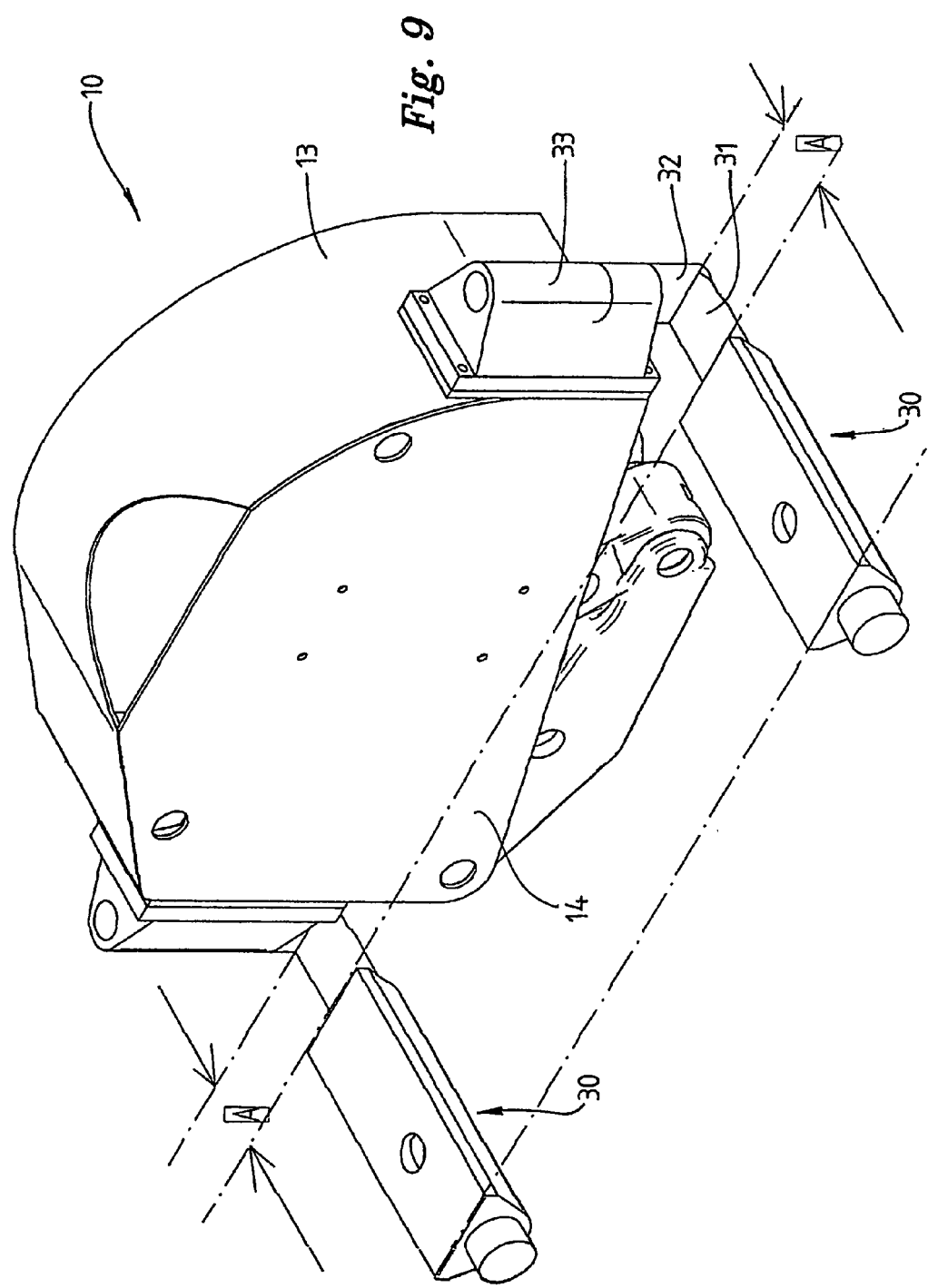
FIG. 9 is a perspective view illustrating a single wheel unit aligned straight.

For example, FIGS. 4 and 9 illustrate a single wheel unit supported on upright pins 32 at the end of two linear actuators 30. The pistons 31 of actuators 30 extend an equal distance from the linear actuator housing 42. Thus, the wheel (not shown) mounted on the suspension mechanism 15, which is supported on the main frame 12, would be aligned at right angles to the actuators 30, and namely aligned parallel with the trailer body 11.

Figure 10:
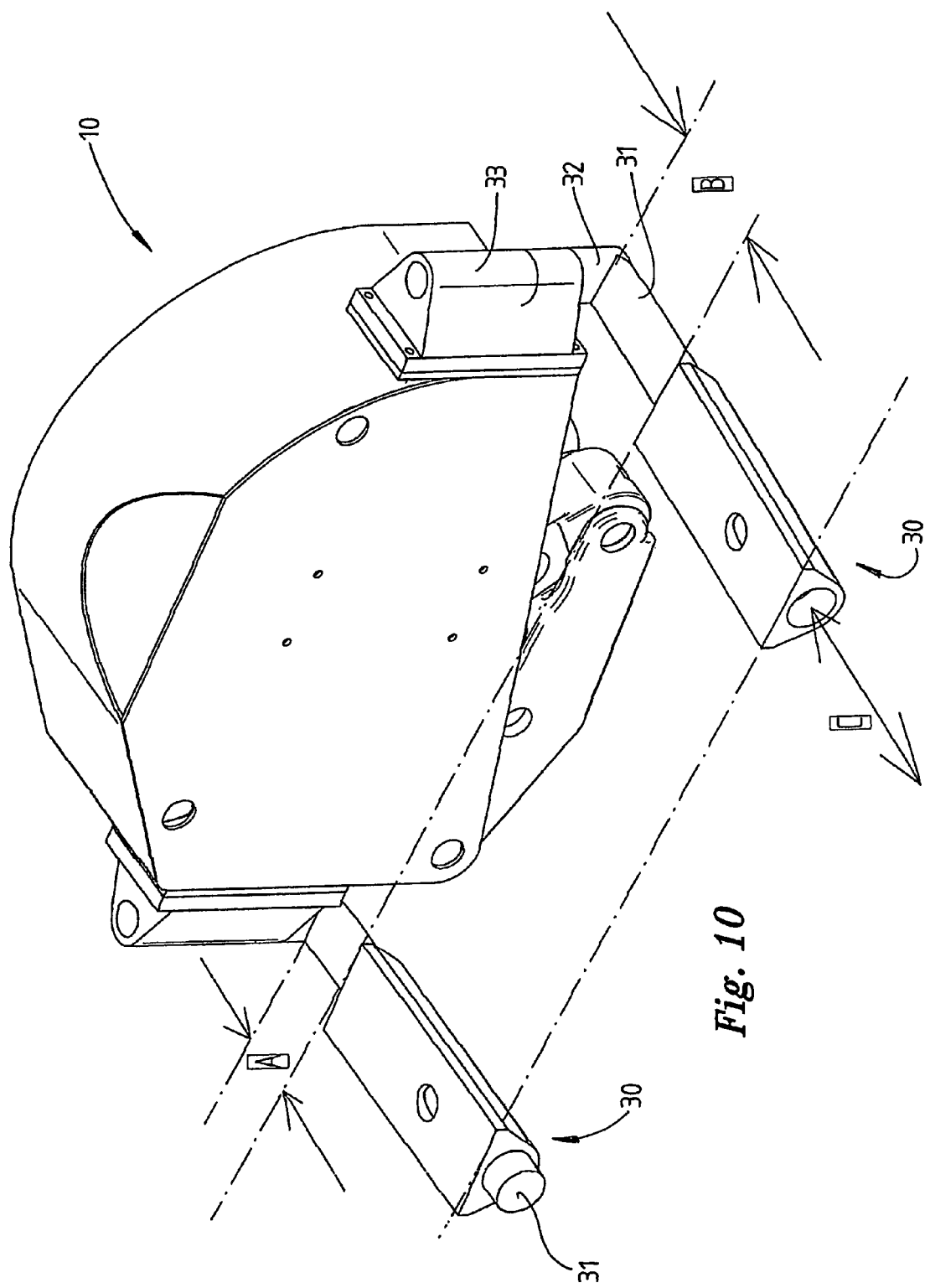
FIG. 10 is a perspective view illustrating the single wheel unit rotated in a first direction.
Figure 11:
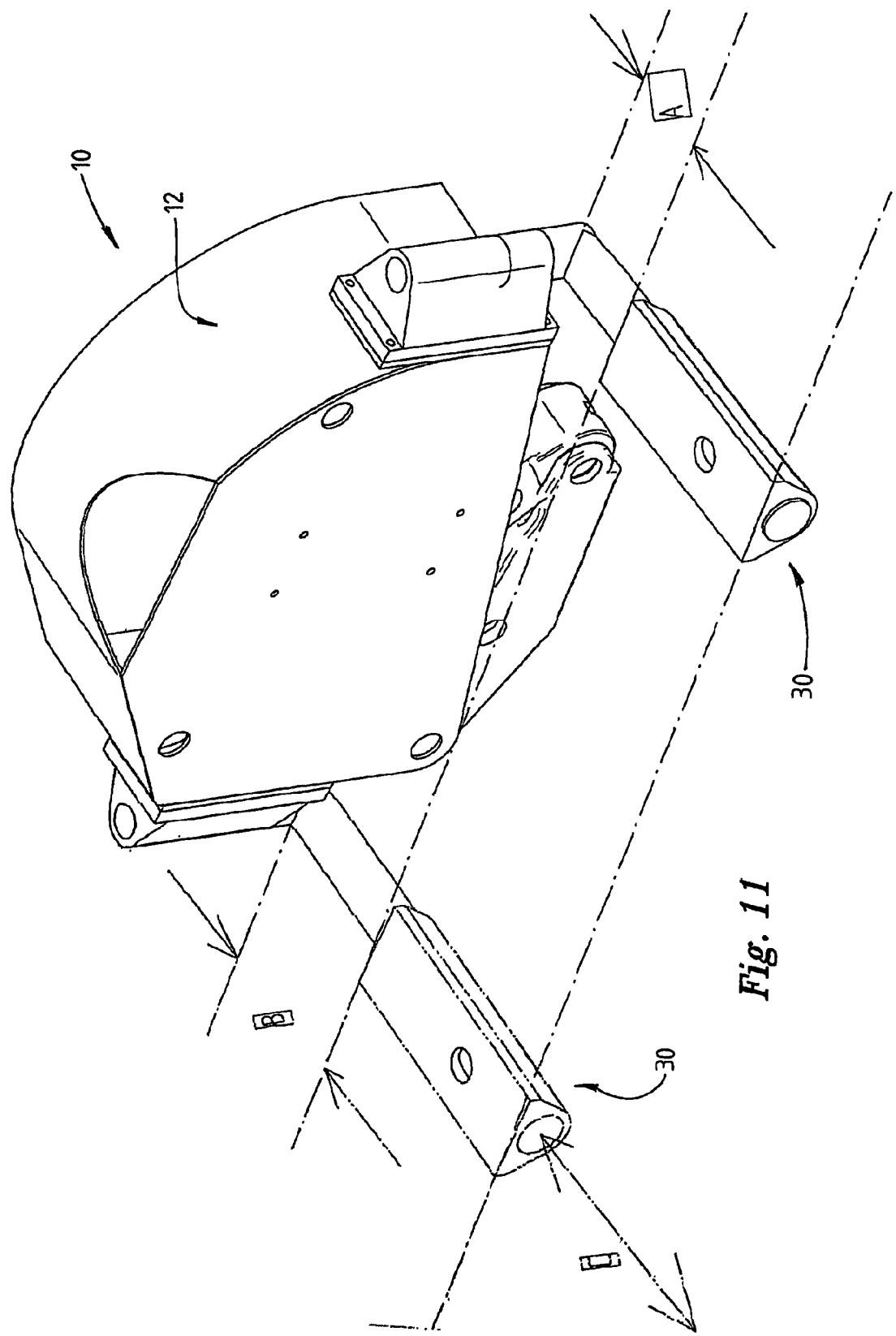
FIG. 11 is a perspective view illustrating the single wheel unit rotated in a second direction.

In FIG. 10 one piston is extended further from the actuator housing than the other piston thereby rotating main frame 12, and a wheel supported by the wheel unit, at an angle to the trailer. FIGS. 5 and 11 illustrate the other piston extended further which has the effect of twisting the wheel unit in the opposite direction to FIG. 10 thereby also turning the wheel in the opposite direction.

By extending the actuator pistons at different lengths the single wheel unit 10, when mounted to a trailer, is able to turn to any degree below a maximum in the right and left directions. The maximum turning angle in any direction is approximately 40°. In the plan views of FIGS. 12 and 13 the turning angle of the wheel unit 10 relative to the trailer body 11 is clearly represented.

Because the fixed between the two actuators is fixed but the distance between pins 32 on each piston varies, at least one of the linear bearing actuators needs to be able pivot on the underside of the trailer body. The actuator can thus pivot with the extending piston.

Figure 12:
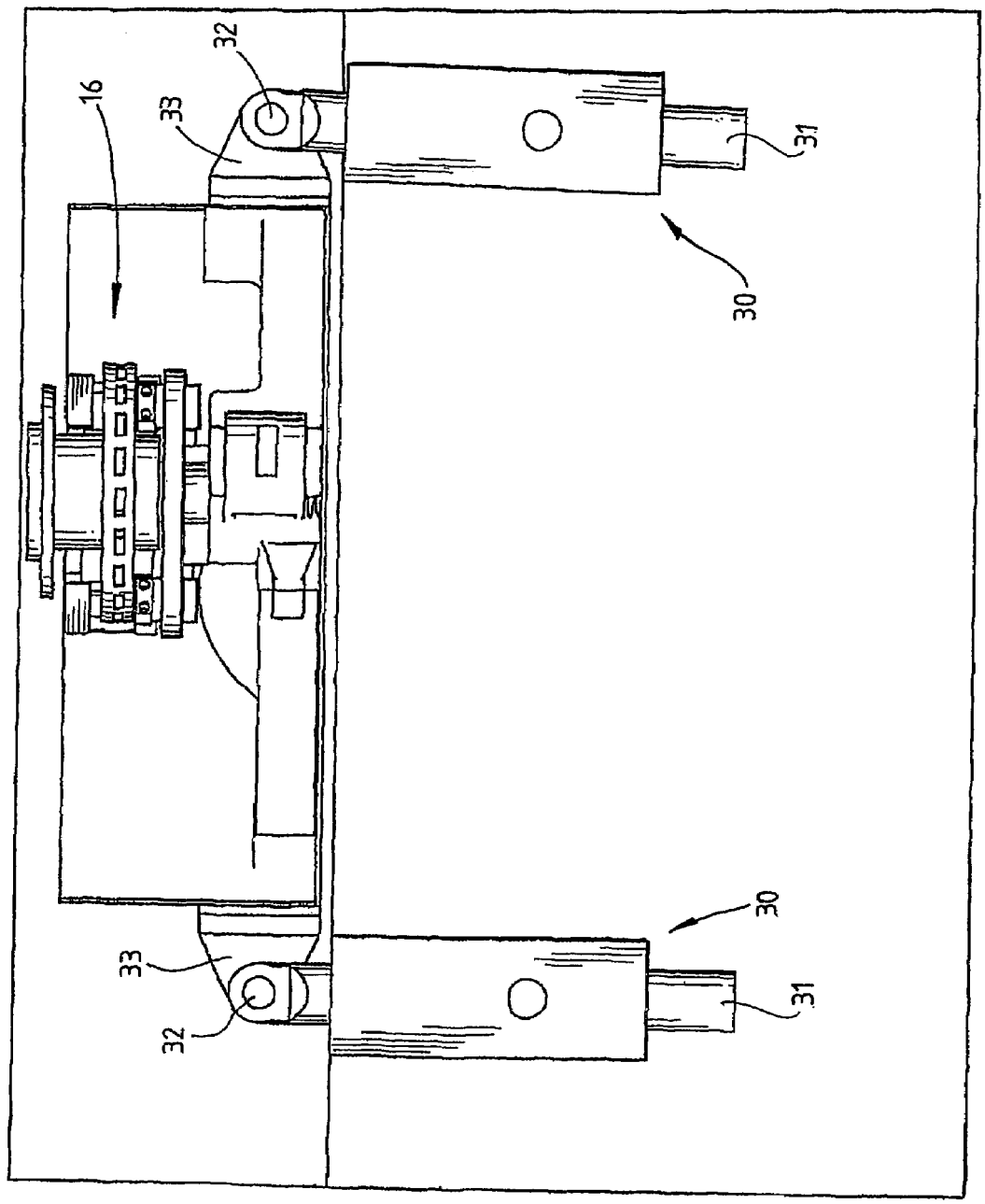
FIG. 12 is a plan view illustrating the single wheel unit aligned straight.
Figure 13:
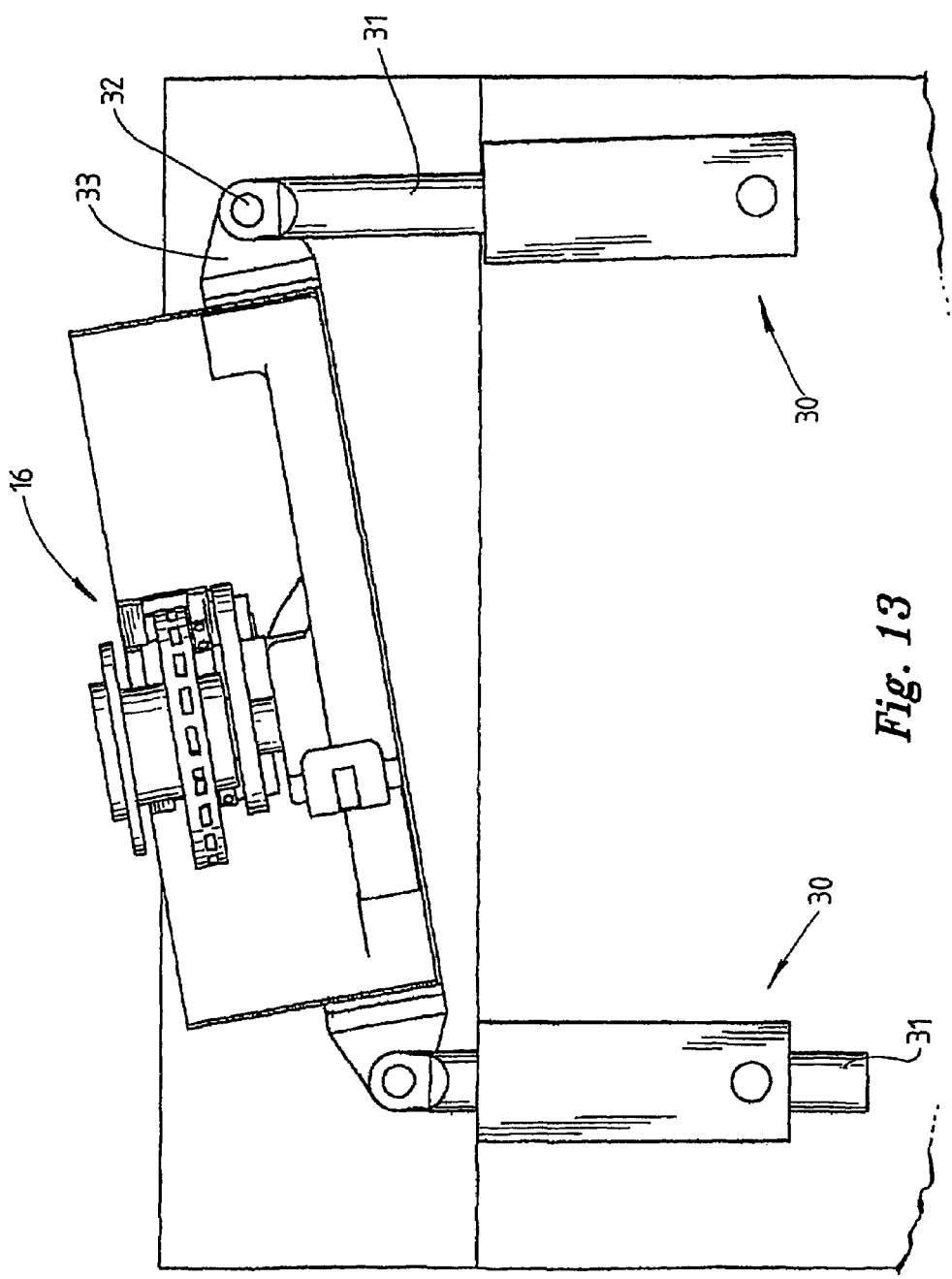
FIG. 13 is a plan view illustrating the single wheel unit rotated.

FIG. 12 which shows the wheel unit in plan view illustrates the wheel hub 21 on the single wheel unit aligned in a straight direction. In FIG. 13 the piston of the bearing actuator on the right has extended outward whilst the piston on the left remains fixed. This rotates the main frame 12 in a counter-clockwise direction. Pin 32 on the right piston inherently also rotates slightly in the counter-clockwise direction. It can be seen that the pivotally mounted bearing actuator on the right of FIGS. 12 and 13 has also rotated slightly counter-clockwise to allow free extension of the piston and unrestricted turning of the main frame 12 and hence wheel. The bearing actuator on the left in the preferred embodiment is securely fixed to the trailer without the freedom to pivot. Whilst both actuators may be pivotally mounted to the trailer body it is only necessary to have one of the actuators pivotally mounted.

It is envisaged that a trailer fitted with the present single wheel units would be provided with full microprocessor steering to synchronize wheel turning with prime mover steering depending on wheel location along the trailer body. As a matter of safety it is recommended the independent automatic steering switches off when the vehicle reaches high speeds.

Ideally, proximity sensors are provided for the automatic steering of the wheel units. Proximity sensors would be located between upright pin 32 and the linear bearing actuators 30. The proximity sensors would measure the relative length of travel of the pistons, and hence steering angle, and relay the measurement back to the microprocessor so that the wheel steering can be adjusted according to variables such as trailer speed and angle of turn of the prime mover.

Furthermore, the vertical travel of the suspension mechanism can be computer controlled to provide an active suspension.

Figure 14:
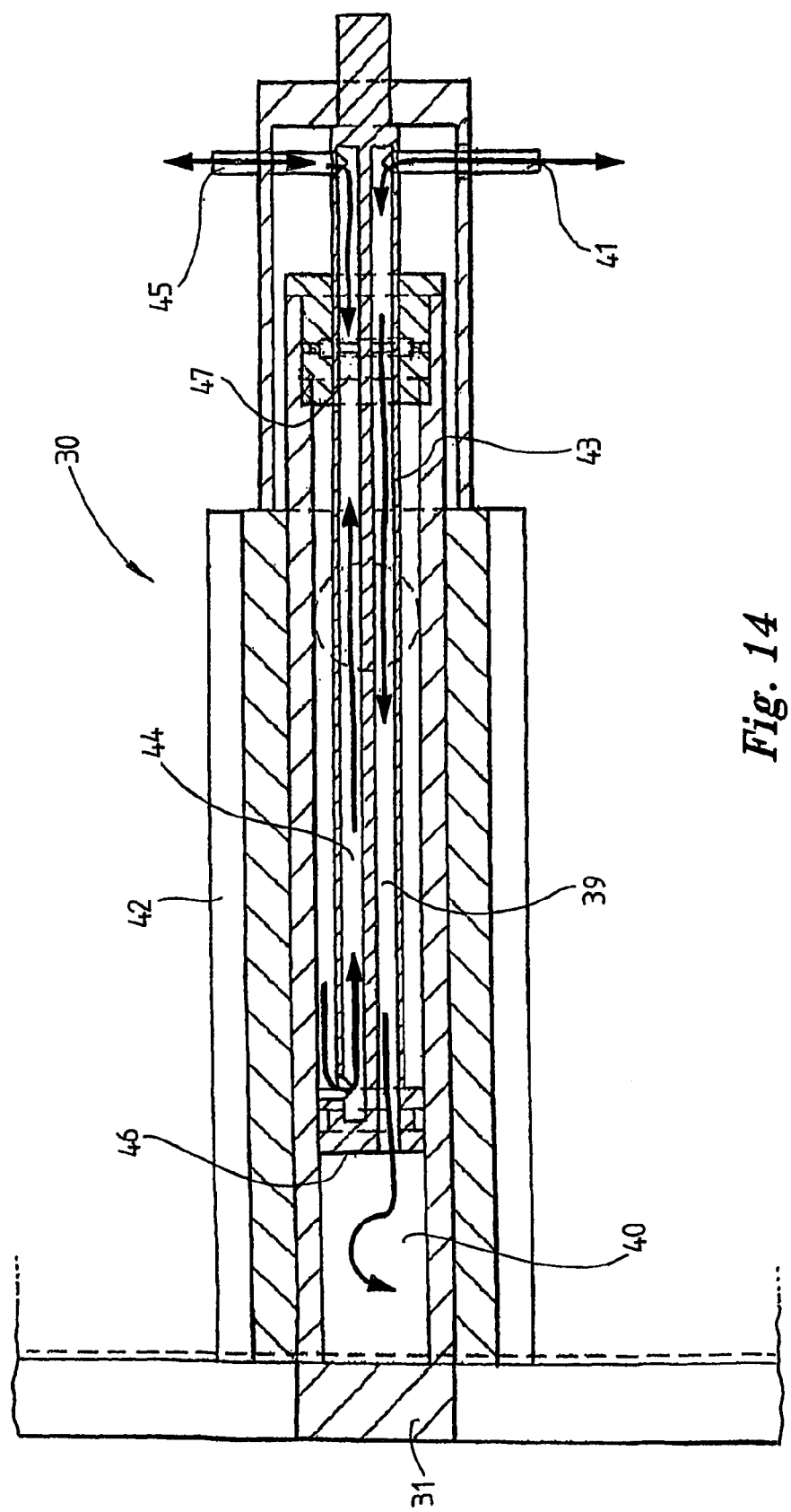
FIG. 14 is a cross section of the linear bearing of the single wheel unit.
Figure 15:
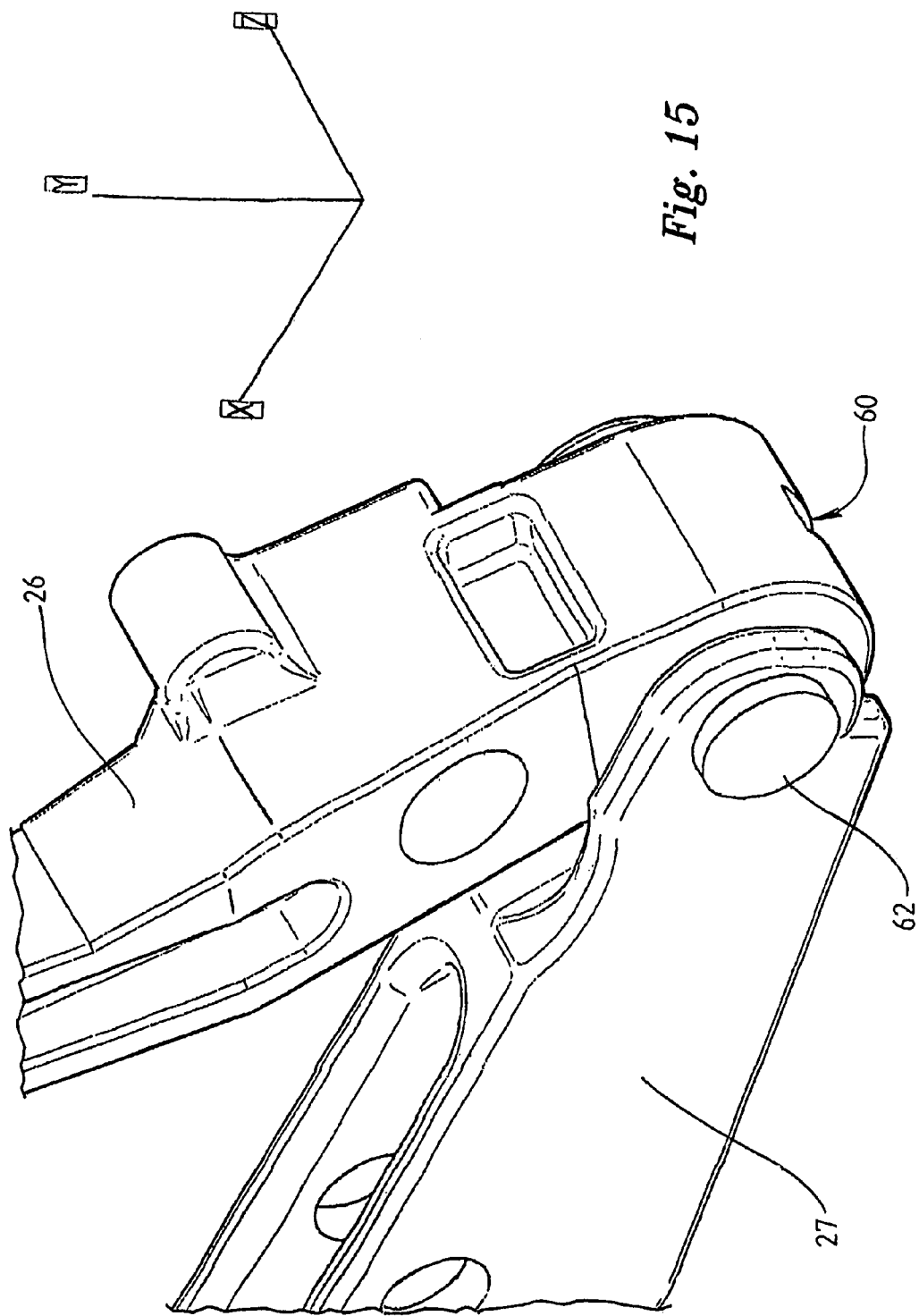
FIG. 15 is a perspective view of a suspension joint of the single wheel unit with a cantilever bearing.
Figure 16:
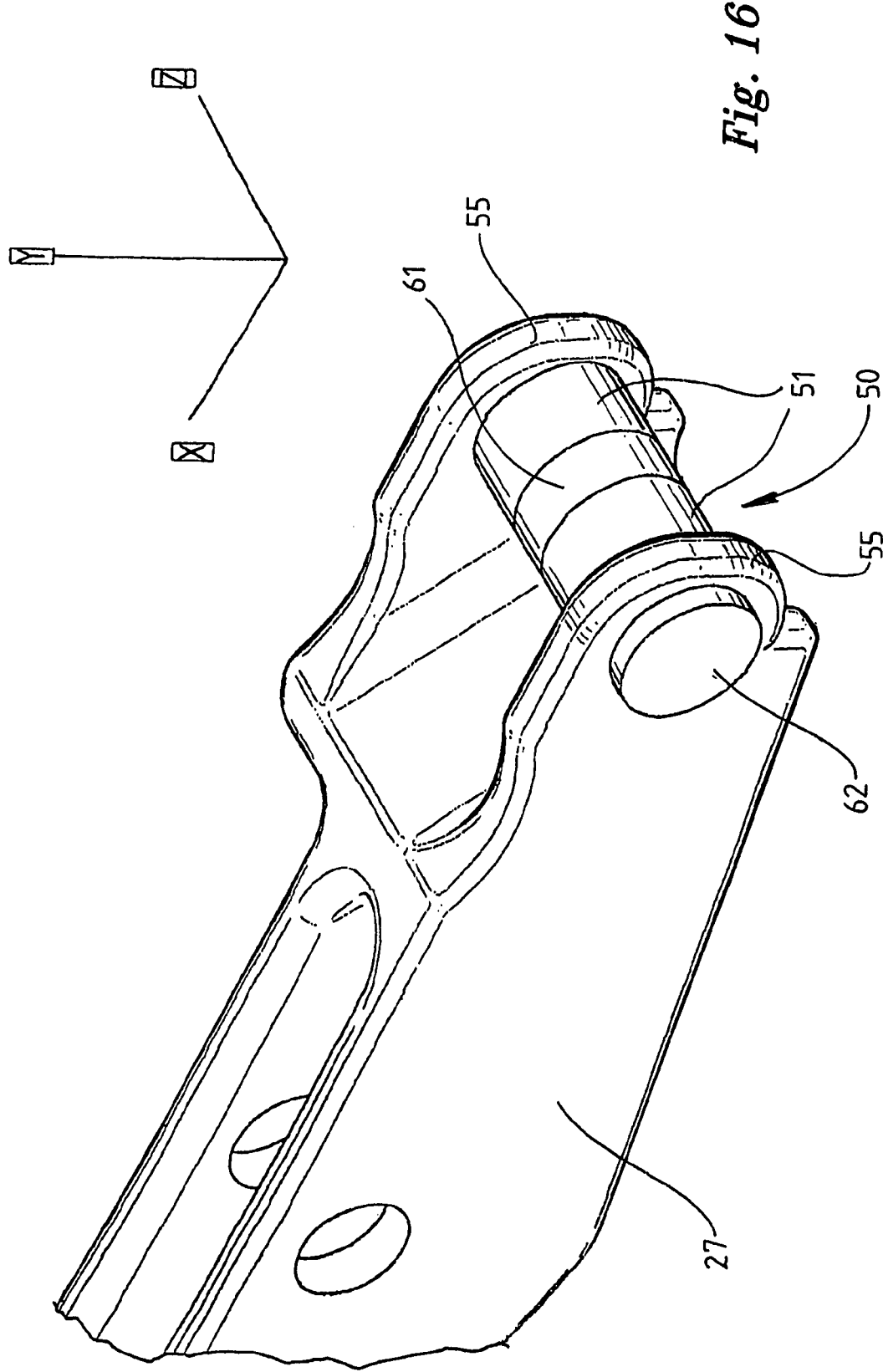
FIG. 16 is a similar view to FIG. 15 illustrating the bearing more clearly.
Figure 17:
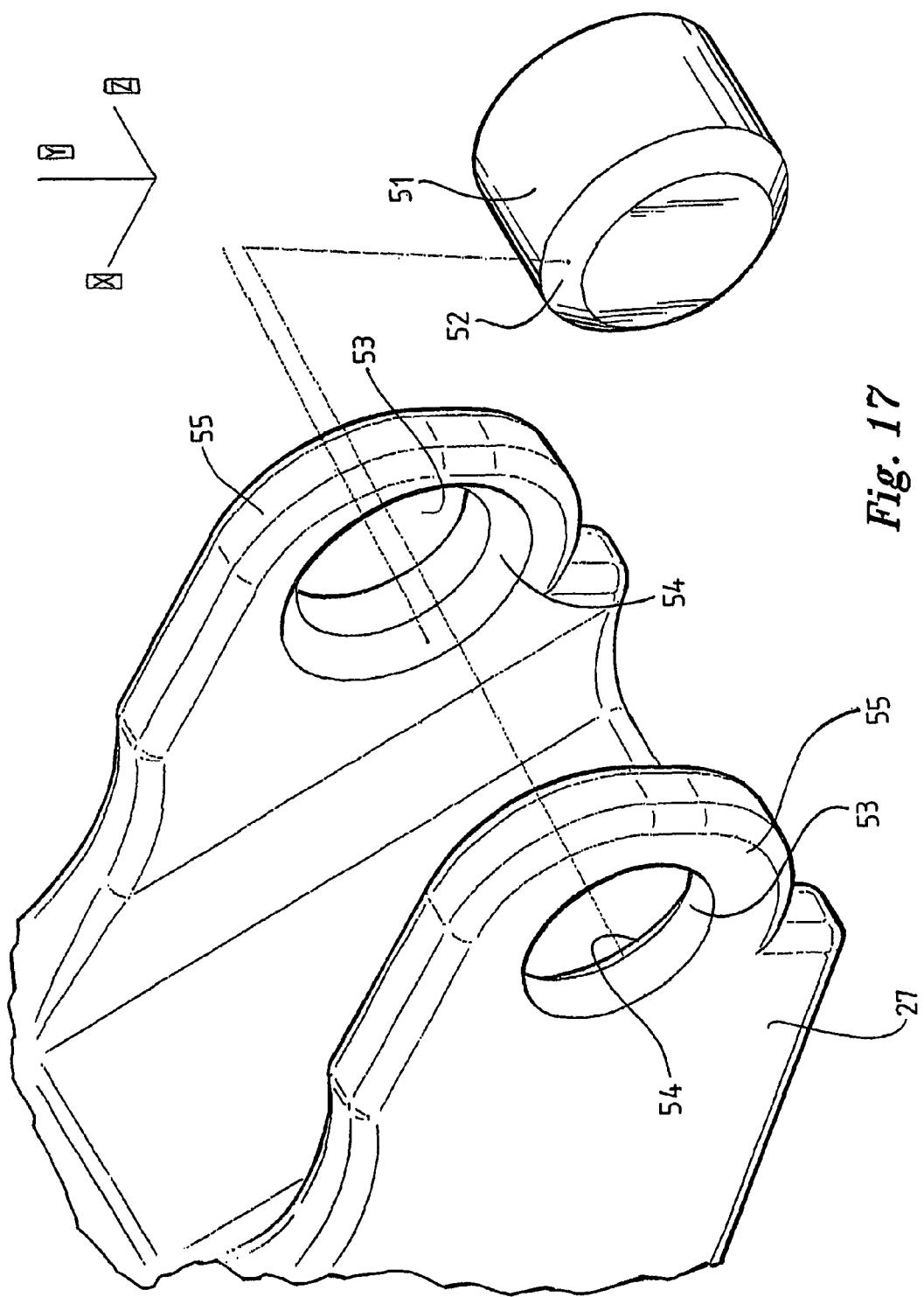
FIG. 17 is a closer view of FIG. 16 illustrating the bearing disassembled.

The linear bearing actuators 30 must be sufficiently robust to take the moment of the entire vertical load of the wheel unit without limiting actuating movement. Accordingly, the fluid pressure inside the hydraulically driven linear actuator is quite high. FIG. 14 illustrates the linear bearing actuator 30 in cross section.

A linear bearing housing 42 is mounted to the underside of the trailer body 11. The actuating motion of piston 31 is driven by hydraulic fluid being alternately pumped into two separate fluid circuits. To move the piston outward of the bearing housing 42, hydraulic fluid is pumped into a piston cavity 40 through a first opening 41 into a first circuit 39 in a fixed central rod 43 in the housing 42. With increasing fluid pressure in piston cavity 40 against a central seal 46 at end of rod 43, the piston 31 is urged to the left of the linear bearing housing 42 as represented in FIG. 14. To withdraw the piston back into the bearing housing hydraulic fluid is pumped into the second fluid circuit 44 through second opening 45 to increase the pressure between fixed central seal 46 and a moveable gland seal 47 at the internal end of piston 31 thereby withdrawing the moveable piston back into the housing and simultaneously discharging fluid in the first circuit from first opening 41.

As shown in FIGS. 15 to 18, a combination thrust and radial cantilever bearing 50 located at the pivoting joint of the central and lower arms carries the vertical and torsional loads as the wheel assembly 16 cantilevered on stub axle 20 rotates the central arm 26 against the lower arm 27. Cantilever bearing 50 is designed to behave well under high deflections of the lower and central arms. The present cantilever bearing 50 evenly distributes the point loads experienced in normal sleeve bearings under high deflective forces which can lead to seizure in the bearing.

The bearing 50 illustrated in FIGS. 15 to 18 comprises two bearing sleeves 51 which have at one open end a spherical shoulder 52 that is adapted to be received in one of two apertures 53 in the lower arm 27. The edges of apertures 53 have a spherical face 54 for mating with the spherical shoulder.

Figure 18:
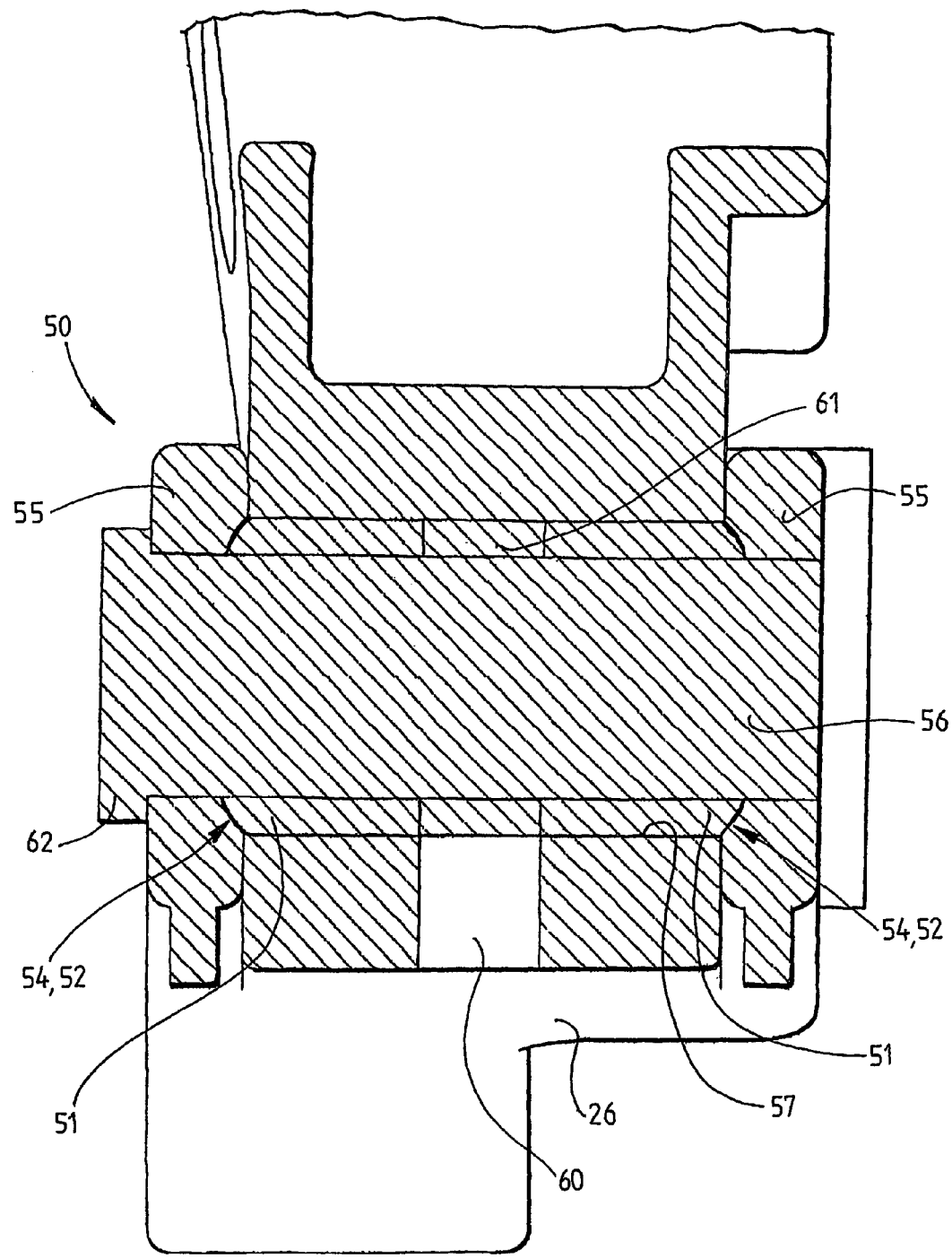
FIG. 18 is a sectional view of the cantilever bearing mounted in the suspension joint.

FIG. 18 illustrates a bearing sleeve 51 with spherical shoulders 52 for seating in the corresponding spherical faces 54. At the pivoting joint with the central arm, lower arm 27 is formed to have two opposing raised joint flanges 55 between which is received the end of central arm 26. The end of central arm 26 has a through bore 57 whilst the apertures 53 are located one in each opposed raised flange 55.

A threaded pin 56 is inserted through the apertured flanges 55 and through the bore 57 in central arm 26. The central and lower arms are thereby relatively pivotable. The bearing sleeves 51 journal the threaded pin 56 into bore 57 such that the sleeves are almost wholly contained within bore 57, but for the spherical shoulders 52 protruding from each end of bore 57. Reference in this respect is made to the cross section illustration of FIG. 18. The mating spherical faces 54 of aperture 53 in the joint flanges 55 closely support the spherical shoulders 52. As a result of the mating spherical shoulders and faces, vertical and torsional loads on the bearing are evenly distributed across the whole spherical shoulder and the concentration of point loads is eliminated.

In assembling the cantilever bearing 50 the two bearing sleeves 51, which are provided with an outer thread, are screwed into bore 57 of central arm 26. Bore 57 has a mating interior thread. The bearing sleeves 51, screwed one into each end of bore 57, are directed with the spherical shoulders 52 facing outwardly of bore 57 and are screwed sufficiently into the bore to locate the end of central arm 26 between the raised joint flanges 55 of the lower arm 27. Once bore 57 is coaxially aligned with the lower arm apertures 53 the bearing sleeves are screwed outwardly of bore 57 by accessing the sleeves through an access slot 60 provided at the end of central arm 26.

With the bearing sleeves screwed outwardly until the spherical shoulders are stably seated in the corresponding mating spherical faces 54, a bearing spacer 61 is inserted through slot 60 to firmly secure the sleeves in position. Threaded pin 56 is then inserted through the aperture in one raised flange, through the cantilever bearing and screwed into an internal thread provided in the aperture of the opposed raised flange. A pin head 62 at the opposite end of the pin to the thread locates against the against flange 55 and tensioning the pin locks the central and lower arms at the joint. The vertical loads at the joint are thereby evenly supported between the pin 56 and bearing sleeves 51 whilst the torsional loads are carried by the spherical shoulders of the bearing sleeves.

Figure 3:
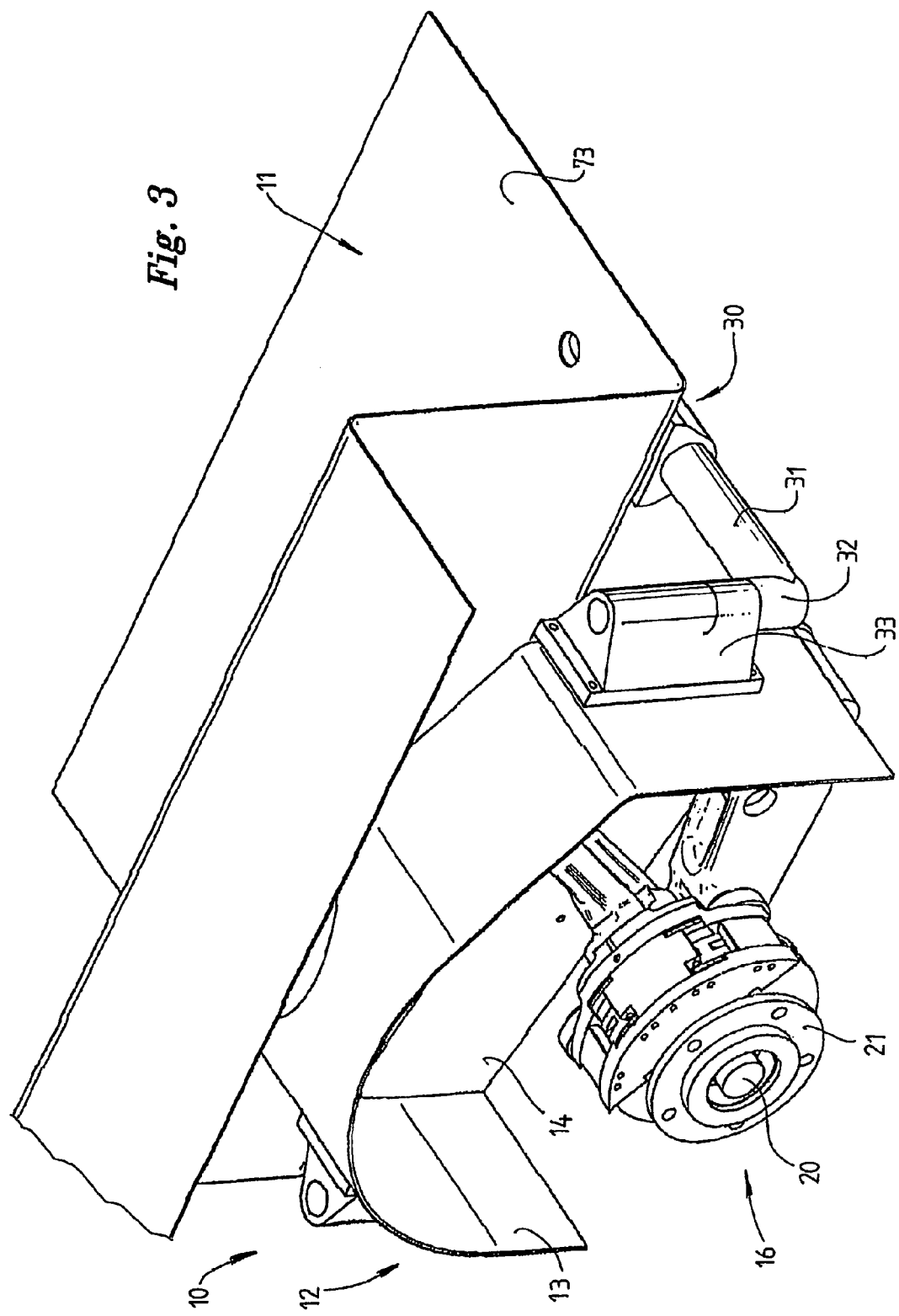
FIG. 3 is an upper perspective view of the wheel unit taken from another angle.

Advantages deriving from the present single wheel unit can be directly gauged in terms of significant increases in trailer carrying capacity, product distribution efficiency, trailer rigidity and cost savings in transportation. By providing a self-contained single wheel unit, cross-axles are eliminated providing the opportunity to lower the trailer deck and thereby increase the storage capacity of the trailer. FIGS. 2 and 3, for example, illustrate the trailer body 11 with the deck 73 lowered to a point well below the stub axle 20. In an averaged size trailer of approximately 100-120 $m^3$ storage volume, the extra storage resulting from the lowered deck can raise the cubic capacity of a trailer by 18 $m^3$. Extra storage capacity translates directly to a greater volumetric transportation load and the opportunity to provide competitive transportation costs per volume of goods.

By virtue of its steerable nature the single wheel units can be evenly mounted along the length of the trailer. This is not possible with common trailers where the wheels must be grouped at the front or rear of the trailer body to avoid scuffing of tyres and suspension problems. Grouping wheels at the front and rear of a trailer requires the trailer to have strong I-beams across the axles to support load at the middle of the trailer where no direct support to the ground is available. The necessity for rigid I-beams is obviated with the present invention because direct ground support through the wheel units is available at regular intervals along the trailer's length. As a result, I-beams can be replaced by structurally lighter beams because the single wheel units are evenly distributed along the full side length of the trailer and uniformly support the trailer beams. The structural strength required in the beams is approximately half that of common trailers. The weight saving on an average trailer itself is 1-2 tons.

Maximum trailer loads are directly related to the maximum allowable weight carried by each tyre per square metre. The more spread out the tyres, the more weight can be carried by the trailer. The single wheel unit not only allows for the longitudinal spread of tyres along the trailer length but also a transverse spread because the spring suspension supporting the wheels are provided on the outer sides of the unit's suspension thereby moving the suspension points laterally outward of the trailer body. Greater distance between suspension points means an increase in the normal payload of a vehicle by about 2.7 tons and even greater depending on the placement of the tyres. For a normal vehicle having a payload of 24-25 tons an increase to 27-28 tons generates considerably more profit savings in the transportation of goods. With a lighter trailer the payload is increased even further.

Since each tyre has its own individual suspension, tyre overload is removed. Furthermore, the single wheel unit lends a vehicle to a better roll-over resistance with the greater distance between opposite suspension points.

It is understood that modifications to the wheel unit and its application may arise. Fore example, the single wheel units may be mounted in tandem pairs linked by a load sharing accumulator.

The many advantages flowing from the present improvements to heavy vehicle wheel assemblies ultimately lead to greater efficiency and cost savings in the transportation industry. The possibility of lowering the deck and shifting the brake assembly allows a further increase in trailer storage capacity. The steerable and independently suspended wheels allow for placement of wheels that inherently strengthen the structural integrity of the trailer which, coupled with a reduction in trailer body weight, allows an increase in payload. The nature of the single wheel unit additionally provides a vehicle with greater maneuverability, a tighter turning circle and greater steering control.

It will be understood to persons skilled in the art of the invention that many modifications may be made without departing from the spirit and scope of the invention.

The claims defining the invention are as follows:

1. A single wheel unit adapted to be mounted on a vehicle body comprising:
   a wheel frame supporting a suspension mechanism and a wheel assembly mounted on the suspension mechanism;
   wherein the suspension mechanism comprises a "Z" link pivotally anchored to the wheel frame at an upper end defined by a free end of an upper arm and at a lower end defined by a free end of a lower arm, and a central arm is pivotally joined end to end to the upper and lower arms, the suspension mechanism being pivotally anchored to the wheel frame, and means for dampening movement of the suspension mechanism, and wherein a wheel stub axle of the wheel assembly is mounted at a lower end of the central arm.

2. The single wheel unit claimed in claim 1, wherein the means for dampening is provided between the wheel frame and the "Z" link and also functions for raising or lowering the wheel assembly relative to the wheel frame.

3. The single wheel unit claimed in claim 2, wherein the means for damping is a suspension cylinder fixed between the wheel frame and the lower arm.

4. The single wheel unit claimed in claim 3, wherein the suspension cylinder is a hydraulic or pneumatic cylinder.

5. The single wheel unit claimed in claim 3, wherein the suspension cylinder is computer controlled.

6. The single wheel unit claimed in claim 2, wherein the suspension mechanism is actuated by the means for damping to travel a vertical distance of 600 mm.

7. The single wheel unit claimed in claim 1, wherein the pivoting joint between the central and lower arms comprises a combination thrust and radial cantilever bearing.

8. The single wheel unit claimed in claim 7, wherein the combination thrust and radial cantilever bearing comprises a cylindrical sleeve assembly defining a central axis and having open ends with curved shoulders, the sleeve assembly being located in a bore of the central or lower arm and a shaft is journaled through the sleeve assembly, the shaft extending through apertured flanges in the other of the central or lower arm which flanges are located on either side of the bore and sleeve assembly, wherein the flange apertures contain curved faces to correspondingly receive the curved shoulders of the sleeves.

9. The single wheel unit claimed in claim 8, wherein the sleeve assembly comprises two co-axial sleeve sections, each having a curved shoulder located at an open end of each sleeve section, and a spacer located inbetween the sleeve sections.

10. The single wheel unit claimed in claim 8, wherein the curved shoulders are convex and face away from the central axis and the curved faces are concave.

11. The single wheel unit claimed in claim 10, wherein the sleeve assembly is substantially fully located in the bore with only the convex shoulders protruding from the ends of the bore to bear against the concave faces.

12. The single wheel unit claimed in claim 1, wherein steering means is mounted between the wheel frame and vehicle body for pivoting the wheel frame relative to the vehicle body so as to steer a vehicle.

13. The single wheel unit claimed in claim 12, wherein at least one of the steering components is pivotally mounted to the vehicle body and the steering components are linear bearing actuators having a reciprocating piston.

14. The single wheel unit claimed in claim 13, wherein the linear bearing actuators operate on two separate hydraulic fluid circuits, and whereby the admission of hydraulic fluid into one circuit causes the piston to extend from an actuator housing and the admission of fluid into the second circuit causes the piston to withdraw into the actuator housing.

15. The single wheel unit claimed in claim 13, wherein the pistons are pivotally attached to the wheel frame by way of a hinge connection.

16. The single wheel unit claimed in claim 15, wherein actuation of a first of the linear bearing actuators causes a leading portion of the wheel frame to displace and to pivot the wheel frame so as to steer the vehicle in a first direction, whereas actuation of a second of the linear bearing actuators causes a trailing portion of the wheel frame to displace and pivot the wheel frame to steer the vehicle in a second, opposite direction.

17. The single wheel unit claimed in claim 15, wherein proximity sensors are located between the linear bearing actuator and the hinge connection.

18. The single wheel unit claimed in claim 1, wherein the wheel stub axle supports a combined hydraulic spring service and park brake entirely within the rim of a wheel tyre.

19. The single wheel unit claimed in claim 1, wherein the wheel unit is controlled by a microprocessor which adjusts the steering of the wheel frame with respect to the vehicle body.

20. The single wheel unit claimed in claim 19, wherein the microprocessor adjusts the steering based on variables including synchronization with corresponding wheel units, vehicle speed and vehicle turning angle.

21. The single wheel unit claimed in claim 20, wherein proximity sensors are provided on the wheel units for measuring the displacement of the steering means and relaying the measurement to the microprocessor for adjusting the steering of the wheel unit.

* * * * *

UNITED STATES PATENT AND TRADEMARK OFFICE
CERTIFICATE OF CORRECTION

PATENT NO. : 7,416,201 B2  
APPLICATION NO. : 10/543461  
DATED : August 26, 2008  
INVENTOR(S) : Karen J. Amores Page 1 of 1

It is certified that error appears in the above-identified patent and that said Letters Patent is hereby corrected as shown below:

Col. 3
Line 2 change "joint; and" to --joint.--
Line 47 change "trailer body 11" to --main frame 12--
Line 49 change "10, and" to --10--

Col. 4
Line 35 change "fixed between" to --distance between--
Line 37 change "able pivot" to --able to pivot--

Col. 6
Line 19 change "the against flange" to --flange--

Col. 7
Line 10 change "Fore" to --For--

Signed and Sealed this

Eighth Day of September, 2009

David J. Kappos
*Director of the United States Patent and Trademark Office*